May 28, 1957 R. L. HAYDEN 2,793,819
FIBER WINDING APPARATUS
Filed June 16, 1953 3 Sheets-Sheet 1
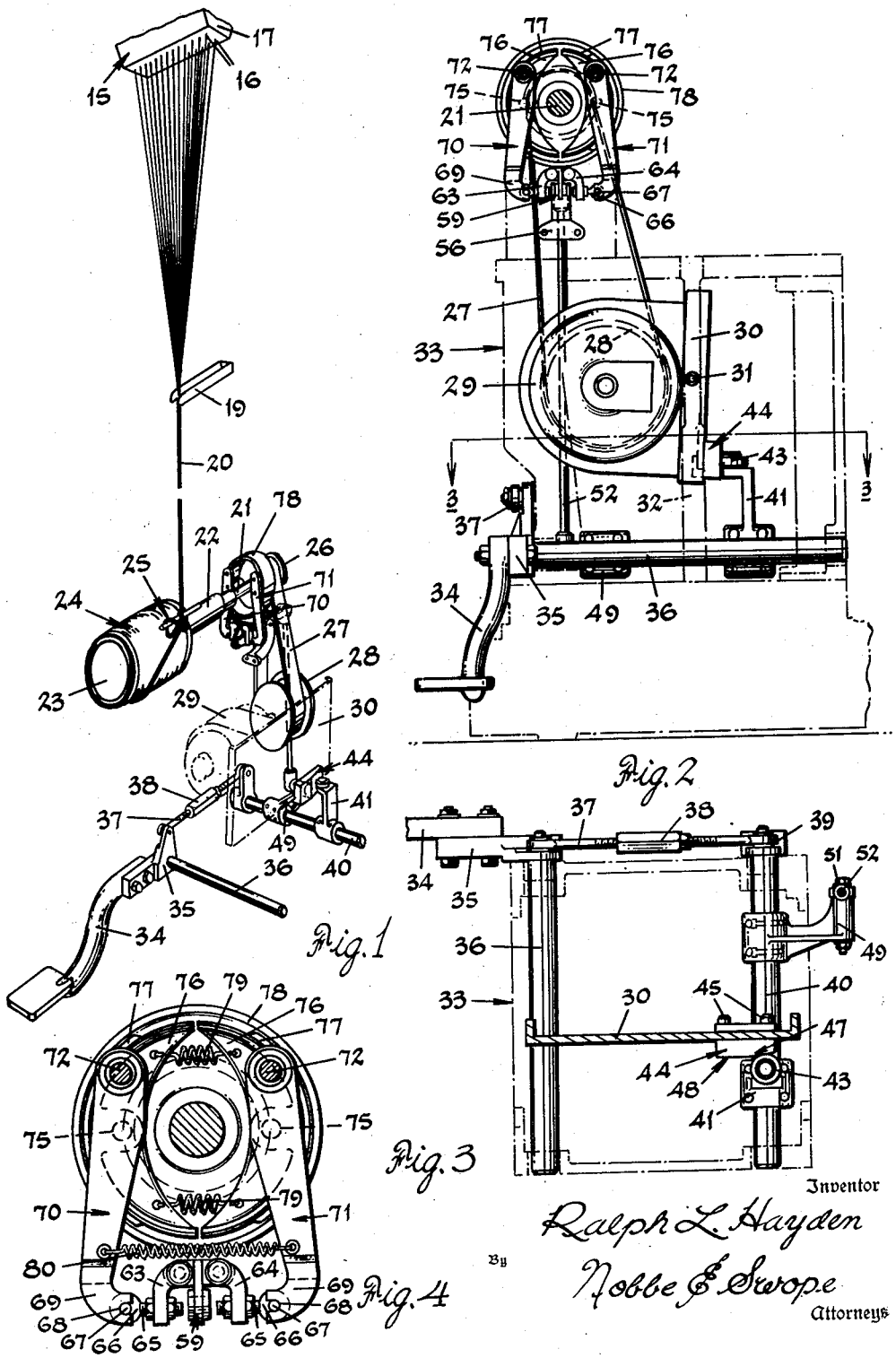
Inventor
Ralph L. Hayden
Nobbe & Swope
Attorneys

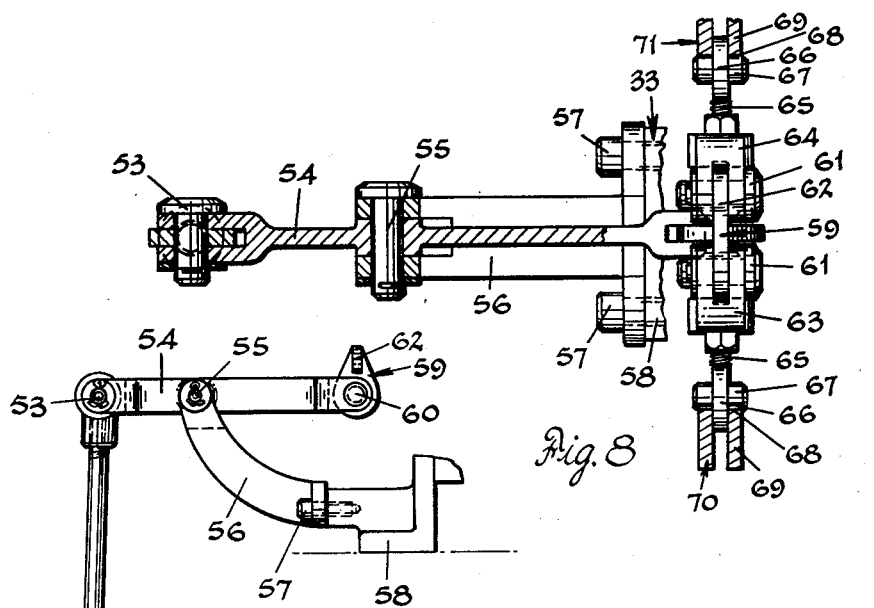
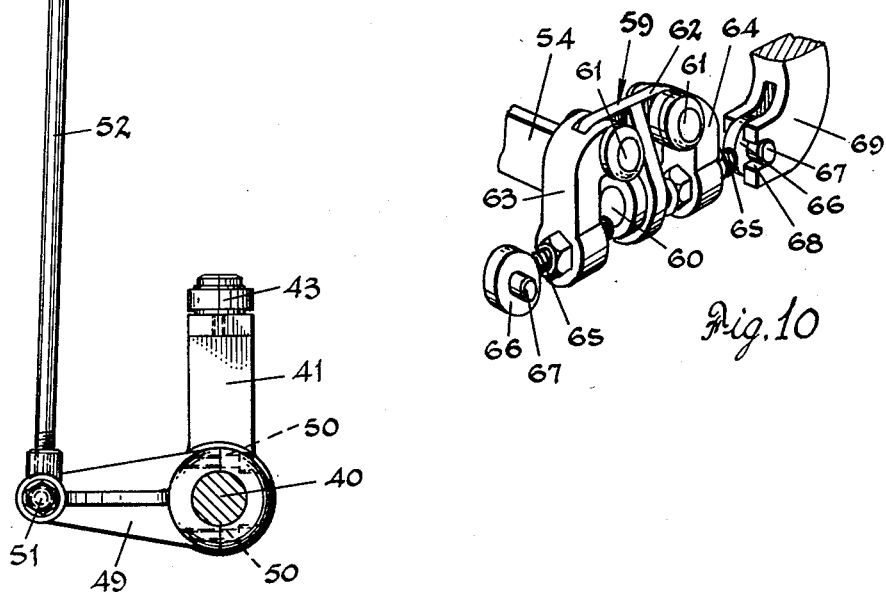

United States Patent Office 2,793,819
Patented May 28, 1957

2,793,819

FIBER WINDING APPARATUS

Ralph L. Hayden, Vienna, W. Va., assignor, by mesne assignments, to L-O-F Glass Fibers Company, Toledo, Ohio, a corporation of Ohio Application June 16, 1953, Serial No. 362,087

4 Claims. (Cl. 242—54)

The present invention relates broadly to the production of filamentary materials, and is more particularly concerned with a new and improved apparatus for winding heat softenable fibrous materials during the continuous manufacture thereof.

Textile glass fibers, with which the present invention has been found particularly well adapted, are presently being commercially produced by flowing a multiplicity of streams from a feeder containing a supply body of molten glass and applying a pulling force to the streams sufficient to attenuate them into a corresponding number of filaments or slivers. During this process, the filaments are gathered or grouped to form a strand which is then wound into a package on a spool, said spool serving as the attenuating means and being rotated at a very high rate of speed. When the desired amount of strand has been wound into a package on the spool, rotation of the spool is discontinued and attenuation is interrupted long enough to permit interchanging an empty spool for the full one. Thereafter the glass streams are drawn by hand and wound onto the spool to initiate the winding operation.

As a consequence of the intermittency which characterizes this winding operation, there results not only a loss of time as the spools are changed, but also, and what is more important, a reduction or stoppage of the glass flow from the feeder.

Under normal operating conditions, attenuation of the molten glass streams is accomplished at winding speeds of 5,000 to 10,000 feet per minute, and at these speeds, certain critical conditions exist which bear importantly on the operation and control of the feeder or bushing. Probably foremost among these is accurate control of the temperature of the molten glass in the bushing. Since uniformity of fiber diameter depends on bushing temperature, and it is known that the high speed movement of the strand produces currents of air which flow across the bottom of the bushing and exert a cooling influence on the glass as well as on the bushing itself, the importance of continuous operation insofar as possible becomes apparent.

It is therefore an important aim of the present invention to provide novel apparatus for winding the fibrous strands characterized by its ability to readily and efficiently initiate and terminate the winding operation with minimum time and production losses in the interruptions associated therewith.

Another object of the invention lies in the provision of apparatus which is well suited to incorporation with existing fiber forming equipment and which may be relatively simply and inexpensively maintained.

Another object of the invention is to provide a winding apparatus for fibrous materials embodying a braking mechanism which rapidly and effectively terminates the winding operation with a minimum of fatigue to the operator.

A further object of the invention is to provide a novel brake mechanism for use in association with fiber winding apparatus, which mechanism includes means for first diminishing the rotative speed of the collet upon which the fibers are wound and means for then terminating the rotation of the collet.

Other objects and advantages of the invention will become more apparent during the course of the following description when taken in connection with the accompanying drawings.

In the drawings wherein like numerals are employed to designate like parts throughout the same:

Figure 1 is a perspective view of a fiber forming unit embodying the present invention;

Figure 2 is a front elevation of the apparatus;

Figure 3 is a view in cross section taken substantially along the line 3—3 of Figure 2;

Figure 4 is an enlarged detail view of a portion of the brake mechanism shown in Figure 2;

Figure 8 is a horizontal section taken substantially along the line 8—8 of Figure 5;

Figure 9 is a detail view of a linkage associated with the present brake mechanism; and Figure 10 is a fragmentary perspective view of actuating means for the brake mechanism.

Figure 5:
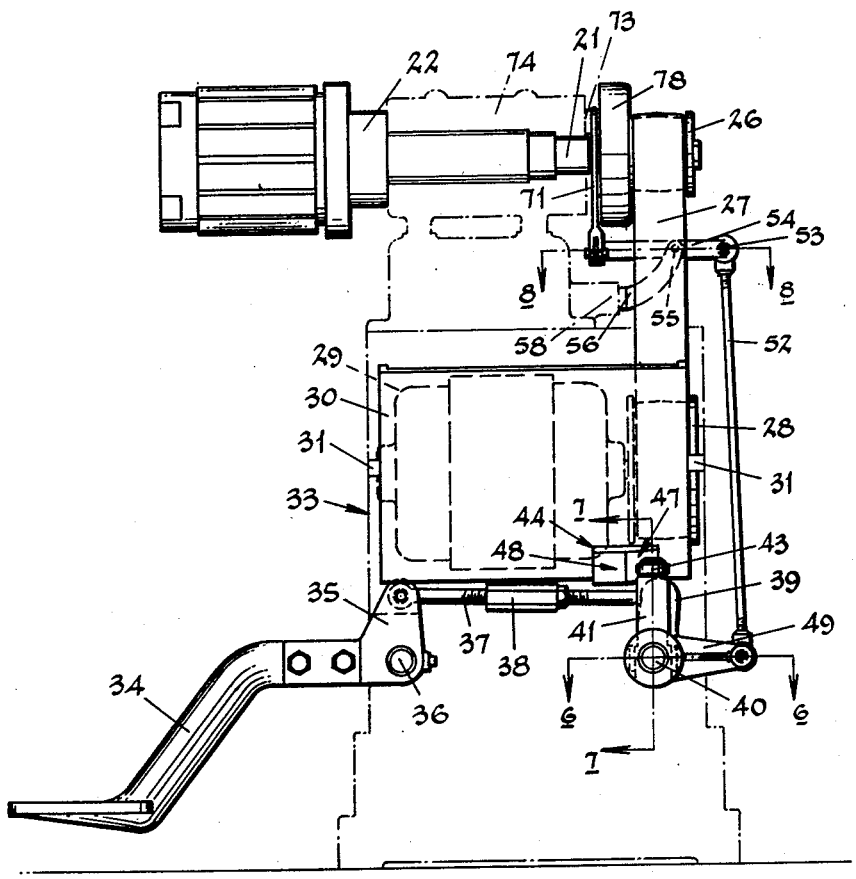
Figure 5 is a side elevational view of winding apparatus embodying the present invention.

The present invention is particularly well adapted to the high speed winding of continuous strands of glass fibers and will be described in that connection here. However, it will be appreciated that the apparatus is of equally important application in the winding of other thermoplastic filamentary materials, such as for example, resinous fibers.

Apparatus of the character suitable for the efficient commercial production of glass fibers is shown in Figure 1 of the drawings, and upon reference thereto it will be seen that there is provided a feeder or bushing 15 within which the glass forming materials are melted, said bushing having a plurality of orifices 16 in its bottom wall 17 from which streams 18 of molten glass flow by gravity. The streams are gathered into a bundle and lubricated by a guide 19 to form a strand 20 which is attenuated to the desired diameter by the high speed rotation of a spindle shaft 21 carrying a collet 22 which receives a readily replaceable strand support tube 23 forming the core of the package 24 produced in the attenuation operation. A traversing mechanism 25, as of the type shown in the Stream Patent No. 2,433,304, is located adjacent the package and functions to wind the strand 20 on the tube 23 in large helices.

Rotation of the spindle shaft 21 is accomplished by the provision of a pulley 26 carried by spindle shaft 21 on its end opposite the collet 22, said pulley having trained thereover a belt 27 which also engages a pulley 28 associated with a motor 29 carried by a mounting plate 30 pivotally connected at 31, Figure 2, to a supporting member 32 positioned within the interior of the winder mechanism housing 33.

Figure 7:
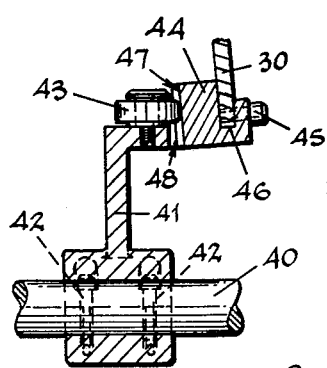
Figure 7 is a vertical section taken substantially along the line 7—7 of Figure 5.
Figure 6:
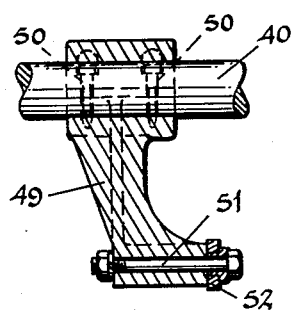
Figure 6 is a horizontal section taken substantially along the line 6—6 of Figure 5.

New and improved means are herein provided to disengage the motor pulley 28 from the belt 27 and to thereby initially slow down the rotation of the spindle 21. Such means are best shown in Figures 2, 3, 5 and 7, and upon reference thereto it may be seen that there is provided a foot treadle 34 secured to a tie plate 35 which is rotatable upon a fixed shaft 36 carried by the winder housing 33. Connected to the tie plate 35 is a link rod 37 having a turnbuckle 38, said rod being secured at its opposite end to a bracket 39 fixed to the main shaft 40 rotatably mounted in suitable fixtures (not shown) carried by the winder housing 33.

The spindle shaft speed control means further comprises an actuating arm 41 fixedly mounted on the main shaft 40 by pins or the like 42 and provided at its upper end with a revolvable member 43 seated in ball bearings or the like on said upper end of the arm 41. Cooperating with the member 43 to pivot the mounting plate 30 and motor 29 carried thereby upwardly and by said movement to raise the motor pulley 28 out of running engagement with the belt 27 is a generally U-shaped shoe 44 secured to said mounting plate. The shoe 44 may be attached to the plate by inserting the slot 46 provided in said shoe over one end of the mounting plate 30, and if desired, may be suitably pinned thereto by bolts and the like 45.

The shoe 44, which in end view is generally U-shaped, presents in cross section a wedge-like apeparance and is therefore provided on one face with a sloped portion 47 which proceeds into an adjacent substantially flat section 48. As shown, the shoe is secured to the lower portion of the mounting plate in a manner whereby the sloped portion 46 is adjacent the rearward edge of the plate. By this arrangement, as will be more fully described hereinafter, the revolvable member 43 progresses forwardly during operation across the length of the sloped portion 47 and onto the substantially flat section 48 to induce pivotal upward movement of the plate and thereby move the motor pulley 28 out of engagement with the belt 27.

There is further provided new and improved means for effectively terminating the rotative movement of the spindle shaft 21 and which means functions in cooperative relation with the spindle shaft speed control means just described to stop the spindle shaft and collet carried thereby immediately after its slow down has been accomplished. The spindle shaft stoppage means are clearly illustrated in the accompanying drawings, and upon reference thereto it will be seen that such means comprises a bracket 49 clamped to the main shaft 40 by pins or the like 50 and having secured to its outer end by bolt means 51 a brake rod 52. Swingably mounted at the opposite end of said rod by a brake pin 53 is a bifurcated connecting arm 54, said arm being pivotally arranged to swing about a fixed fulcrum provided by pin means 55 which attaches the arm 54 to a bracket 56 secured at its opposite end by a bolt and the like 57 to a supporting member 58 of the winder housing 33.

The opposite end of the bifurcated connecting arm 54 is movably joined to a generally T-shaped link 59 by a pin 60 or other suitable means, and said link is further movably attached by pins or the like 61 at the ends of its horizontal arm 62 to a pair of brake clevises 63 and 64. Each clevis 63 and 64 is of substantially the same construction, being bifurcated at one end to overlap the ends of the horizontal arm 62 of the link 59 and bored at the other end to receive adjusting bolts 65 having disk-shaped heads 66 provided with pins 67 which are received by notches 68 within the bifurcations 69 in the brake arms 70 and 71.

As shown in Figure 4, the brake arms 70 and 71 are substantially L-shaped and are pivotally carried by pins 72 carried by bosses 73 provided on one end of the upper portion 74 of the winder housing 33. Mounted on the rear or outward surface of the brake arms by suitable pins 75 are the brake shoes 76 having linings 77, which, upon activation of the brake device, engage the drum 78 supported on the spindle shaft 21 upon which is also mounted the drive pulley 26 and collet 32. The brake shoes 76 are normally urged inwardly away from the brake drum 78 by a pair of springs 79, while an additional spring 80 is provided to restore the brake arms 70 and 71 to an inactive position and to cause upward movement of the foot treadle 34 upon completion of the braking operation.

The operation of the foregoing apparatus may be described as follows. When the operator desires to slow down and stop the rotation of the collet 22, as when replacing the full package 24 with an empty tube 23, he presses downwardly on the foot treadle 34 causing forward movement of the link rod 37 and forward rotative movement of the bracket 39 and main shaft 40 associated therewith. Rotation of the shaft induces a forward rolling action of the revolvable member 43 carried on the actuating arm 41 against the sloped portion 47 of the U-shaped shoe 44, and as said member advances thereon and onto the substantially flat section 48 of said shoe 44, the motor mounting plate 30 carrying the shoe 44 is pivoted forwardly and upwardly about the point 31 to raise the pulley 28 of the motor 29 out of engagement with the belt 27, thereby slowing down the collet 22.

Substantially simultaneously therewith, the bracket 49 also carried by the main shaft 40 is caused to move rotatively upwardly by the rotation of said shaft. Accordingly, the brake rod 52 secured to said bracket is directed upwardly pivoting the bifurcated arm 54 connected thereto about the fixed fulcrum provided by the pin means 55 and exerting thereby a downward thrust on the generally T-shaped link 59 joined to said arm 54.

As said link 59 is forced downwardly, the brake clevises 63 and 64 swingably carried by said link 59 are pivoted outwardly therefrom causing the pins 67 of the disk-shaped heads 66 of the adjusting bolts 65 threaded into the clevises to exert an outward force on the brake arms 70 and 71 through engagement of said pins 67 with the notches 68 of the bifurcations 69 in said brake arms. Consequent upon the outward movement imparted thereto, said brake arms are pivoted about the pins 72 and the linings 77 of the shoes 76 mounted on said arms are forced into contact with the brake drum 78, terminating the normal rotation of the same and the spindle shaft 21 upon which it is secured.

Although such means are not specifically illustrated, a suitable switch is of course provided to shut off the motor 29 after the collet 22 has been stopped in accordance with the foregoing procedure. In addition, the winder mechanism in its entirety normally embodies a separate motor to operate the traverse 25 which directs the lay of the strand 20 onto the tube 23, and also an appropriately designed timing mechanism to assure full speed operation of the collet 22 before the traverse begins its operation.

It may thus be seen from the present disclosure that there is herein provided a braking mechanism for continuous forming winding apparatus which simply and effectively terminates the winding operation when desired, and which by reason of its rapid and efficient mode of operation, provides little, if any, of the fatigue normally associated with braking devices of the character heretofore known and also reduces production losses consequent upon intermittent winding cycles to a degree previously thought unattainable.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. Apparatus for winding a continuous strand, comprising a frame, a spindle rotatably journaled on the frame and adapted to carry a spool upon which the strand is wound, brake means on said spindle, a plate member movably mounted on the frame and having a raised portion thereon, power means supported on said plate member and operably connectable to the spindle for rotating the same, a control member mounted on the frame, first means connected to said control member and engageable with the raised portion of the plate member for moving the power means to an inoperable position, means connecting the control member to said brake means to actuate the same and apply a braking force to said spindle whereby initial movement of said control member is effective to remove the rotatable force from the spindle and subsequent movement of said control member is effective to apply a braking force to said spindle.

2. Apparatus for winding a continuous strand, comprising a frame, a spindle rotatably journaled on the frame and adapted to carry a spool upon which the strand is wound, brake means on said spindle, a plate member pivotally mounted on the frame and having a raised portion thereon, a motor supported on said plate member, a belt connected between said motor and said spindle for driving the spindle, a control member mounted on the frame, first means connected to said control member and engageable with the raised portion of the plate member for moving the power means to an inoperative position, means connecting the control member to said brake means to actuate the same and apply a braking force to said spindle, said first means including a rotatable shaft carrying a member engageable with the raised portion on the plate member to pivotally move the motor means carried thereby out of operative engagement with the belt member.

3. Winding apparatus of the character defined in claim 2, in which the raised portion on the plate member is provided with a tapered section and a substantially flat section, and in which the member carried by the rotatable shaft successively engages the tapered section and substantially flat section of the raised portion to pivotally move the motor means carried thereby out of operative engagement with the belt member.

4. Apparatus for winding heat softenable fibers comprising a supporting framework, a rotatable spindle on said framework carrying a spool upon which the fibers are adapted to be wound, a plate member movably mounted on said framework, means including a motor arranged in operative relation with the spindle and carried by said plate member for applying a rotative force to the spindle, and means carried by the framework to remove the rotative force from the spindle and to thereafter apply a braking force to said spindle, said means including a rotatable shaft carrying a member engageable with the plate member to move the motor out of operative relation with the spindle, and a member pivotally connected to a vertically disposed rod-like member, said rod-like member being operatively connected to a pair of brake arms, said arms applying a compressive braking force to the spindle upon rotation of the shaft and pivotal movement of the rod-like member.

References Cited in the file of this patent

UNITED STATES PATENTS

| | | |
|---|---|---|
| 1,850,102 | Grout | Mar. 22, 1932 |
| 2,030,988 | Hofstetter | Feb. 18, 1936 |
| 2,175,551 | Perry | Oct. 10, 1939 |
| 2,550,131 | Wodetzky | Apr. 24, 1951 |
| 2,595,040 | Wood | Apr. 29, 1952 |
| 2,690,308 | Gilbert et al. | Sept. 29, 1954 |